United States Patent Office 3,764,387
Patented Oct. 9, 1973

3,764,387
NON-TREEING ELECTROLYTE WICK
Robert E. Stark, Littleton, Colo., assignor to The Gates Rubber Company, Denver, Colo.
Filed Jan. 28, 1972, Ser. No. 221,726
Int. Cl. H01m 3/04, 43/02
U.S. Cl. 136—28                17 Claims

ABSTRACT OF THE DISCLOSURE

A relatively non-absorbent, yet surface wettable material is positioned within a portion of the space between the edge of the cell pack and container of an electrochemical cell. The surface wettable material improves electrolyte distribution within the cell by a wicking or capillary mechanism and yet prevents dendritic growth from bridging around the edge of the separators by providing an extended growth path permeated by an oxidizing gas. In an alternative embodiment, a relatively absorbent material is interposed between the surface wettable material and container to function as an electrolyte well for proper distribution and incorporation of additional electrolyte within the cell.

BACKGROUND OF THE INVENTION

This invention pertains to rechargeable electrochemical cells which are operated in a normally sealed condition and which utilize a relatively "starved" amount of electrolyte, and more particularly to such cells which characteristically produce objectionable dendritic growths upon charge and which suffer from a non-uniform electrolyte distribution phenomenon.

During discharge of alkaline electrochemical cells containing a zinc electrode, e.g. a nickel-zinc well, containing a semi-permeable membrane separator layer interposed between bibulous separator layers, and a starved amount of electrolyte, it is believed that the reduced nickel species tends to take up water of hydration into its crystal lattice within the cathode, leaving the cathode side of the membrane relatively dry and devoid of appreciable amounts of electrolyte. This dry cathode problem is particularly acute during high discharge rates, e.g. well above the nominal one hour rate. During charge and overcharge, the cathode also tends to become dry due to a tendency of electrolyte to accumulate on the anode side of the semi-permeable membrane. Furthermore, if the time period between charge and discharge is short, the electrolyte is not allowed sufficient time to be transported to the cathode side of the semi-permeable membrane, further preventing wetting of the cathode side. The result is a reduction in discharge efficiency and increase in internal impedance of the cell.

The use of a limited or starved amount of electrolyte (i.e. substantially no free electrolyte present) in an electrochemical cell attenuates dendritic growths. These growths may form upon charge of the cell and propagate from the negative electrode and penetrate the inter-electrode separator and short out the cell. At least one layer of a semi-permeable membranous material is often utilized in the separator to act as a barrier to these tree-like growths. It has also been discovered that this semi-permeable membrane layer is advantageously made to extend or overhang beyond the edge of at least one of the adjacent separator layers to discourage bridging of the edges of the separator by the dendrites. The resulting circuitous path and high access to an oxidizing gas further reduces the chance of any dendritic growths from reaching the cathode.

Examples of the state of the art may be found in United States Patent Office Classification 136, Batteries, exemplified by U.S. Pat. No. 3,350,225 (Seiger), and U.S. Pat. No. 3,489,609 (Popat et al.).

Among the objects of the invention include the primary object of alleviating the aforementioned dry cathode problem by providing a non-treeing electrolyte wick path for improved electrolyte transport and redistribution within the cell.

It is another object to attain such improved redistribution of electrolyte together with inhibiting the growth and propagation of dendrites around the separator edges.

It is another object to provide an electrolyte well within the cell container to improve electrolyte distribution and to minimize the criticality of electrolyte fill characteristic of starved electrolyte systems.

It is a further object to provide a normally sealed zinc electrode containing electrochemical cell with improved discharge efficiency and reduced cell impedance.

These and other objects of the invention are met, and the drawbacks of the prior art solved by employing the cell configuration of the present invention as described herein.

SUMMARY OF THE INVENTION

Briefly described, in one aspect of the invention a relatively non-electrolyte absorbent yet surface wettable material is interposed within a portion of the space between the container and extending separators in a normally sealed electrochemical cell, the surface wettable material intimately contacting the extending separators. In another aspect of the invention, an additional material characterized by being relatively electrolyte absorbent is placed between and intimately contacts the container and the aforementioned surface wettable material, making sure that the relatively absorbent material is isolated from direct contact with the separators. In each case the relatively non-absorbent material acts as a wick for redistribution of electrolyte and yet is permeable to an oxidizing gas for degradation of dendrites.

The invention has particular utility in electrochemical cells having a negative electrode, such as zinc, likely to produce dendrites and cells containing such electrodes and utilizing a relatively limited amount of electrolyte and a semi-permeable membranous separation material.

BRIEF DESCRIPTION OF THE DRAWINGS

Reference will be made to the accompanying drawings showing certain embodiments of the invention, in which like numerals designate like parts in the several figures, and wherein.

PREFERRED EMBODIMENTS OF THE INVENTION

Figure 1:
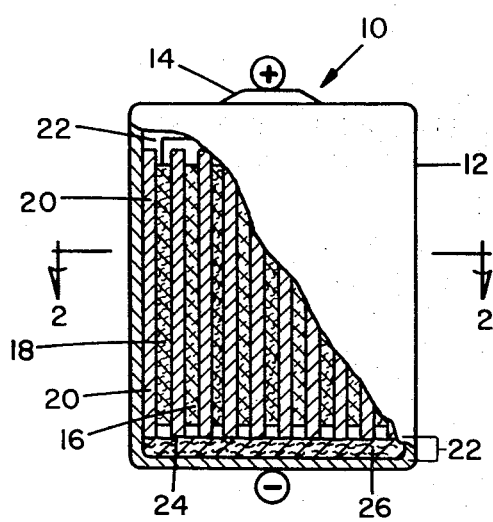
FIG. 1 is a partial cutaway of a sealed electrochemical cell.
Figure 2:
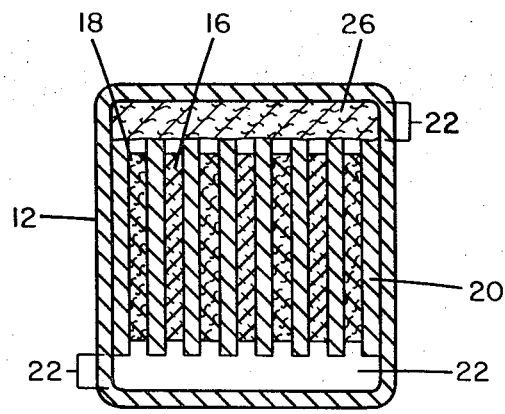
FIG. 2 is a cross-sectional view taken along section 2—2 of FIG. 1.

Referring to FIGS. 1 and 2, an electrochemical cell is shown generally at 10 and comprises a rectangular container 12 enclosing a cell pack and sealed by an insulatingly disposed top 14 containing a resealable safety valve (not shown) for release of any extreme pressures which may develop during operation of the cell. The cell pack consists of a set of parallel stacked positive plates 16 and negative plates 18 sandwiching interposed separators 20. The marginal edges of the separators 20 will normally extend beyond the edges of the positive and negative plates to discourage tree-like conductive growths from bridging the inter-electrode space. To further discourage such growths, the cell pack peripheral edge is spaced 22 away from the edge of the container. Thus, in the rectangular parallel stacked plate cell shown in the drawings, there are four such interconnected spaces around the edges of the plates and separators.

According to the invention, at least a portion of these spaces 22 contain a relatively non-electrolyte absorbent, yet surface wettable material 26 which is in intimate contact with the extending separators 20 at edge points 24, for instance.

It will be appreciated that a variety of other cell configurations may be utilized other than the structure shown in FIGS. 1 and 2. For instance, a spirally wound cylindrical cell could be employed, in which a space would be left below and above the ends of the spirally wound cell pack for incorporation of the surface wettable material 26 in at least a portion of this space. As another example, a cylindrical parallel plate cell could be employed, in which the centrally disposed cell pack would be spaced away from the cell container to form an annular space for incorporation of the surface wettable material 26.

Examples of electrochemically active material useful for incorporation in the positive electrode 16 include silver oxides, manganese-dioxides, oxygen gas, and nickel oxides (e.g. nickel hydrate), the latter being preferred. The positive electrode may take on a variety of shapes and configurations, although a flexible structure capable of being compressed or rolled into a desired pressurized configuration within the cell container is preferred. Thus, conventional electrodes such as the sintered type, pasted type, or of a pressed powder configuration are examples of useful types. The active material is preferably secured to a suitable mesh, sheet or grid substrate.

The negative plate 18 preferably contains an active material, e.g. zinc, which has a very satisfactory activity and voltage characteristic, but suffers from the phenomenon of producing dendritic growths upon charge of the plate. This zinc electrode may also be of conventional construction and be composed of a thin sheet, mesh or grid substrate pasted, sintered, impregnated or otherwise securely made active with a uniform bonded layer or covering of zinc-active material.

Figure 3:
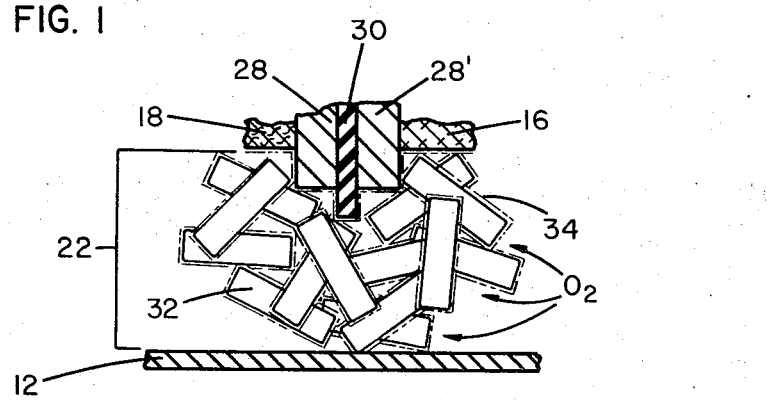
FIG. 3 is an expanded view of the portion of the cell between the edge of the separator and container wall.
Figure 4:
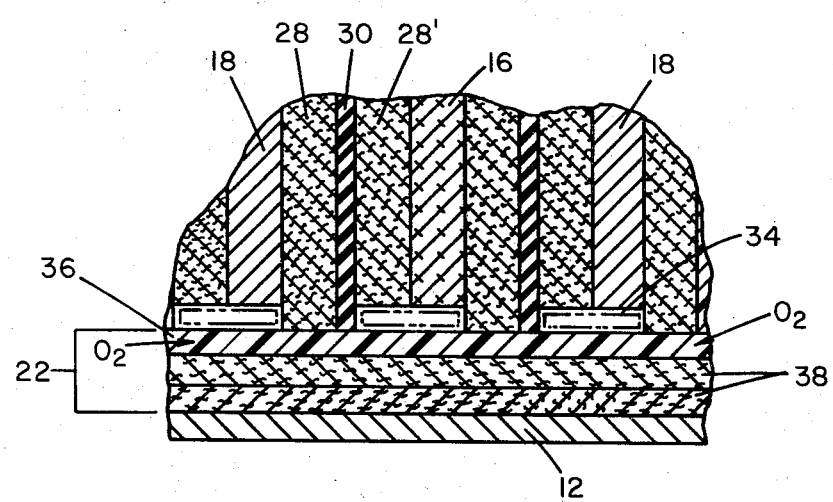
FIG. 4 depicts a modification of the invention also showing a blown-up view concentrating on the space between the edge of the cell pack and container wall of the electrochemical cell.

The separator layer 20 may consist of a unitary layer with impregnated transverse zones, or may consist of a plurality of discreet layers so positioned that the separator will preferably consist of outer bibulous layers or zones which contact the respective electrodes together with an inner barrier zone or layer which is permeable to electrolyte ions but substantially prevents dendritic growth penetration. Examples of suitable triplex separator constructions are shown in FIGS. 3 and 4. Therein, the separator consists of two outer bibulous layers 28 and 28' sandwiching (with or without bonding) an inner semi-permeable membranous layer(s) 30, made of regenerated cellulose, for instances, which preferably protrudes beyond at least one of the marginal edges of the adjoining bibulous layers. The bibulous layer adjacent the negative electrode should conform very closely and follow the contour of the adjacent negative plate. The interface formed between the bibulous layer and negative plate should be invariant by being substantially free of occluded voids. Such an invariant interface may be obtained, inter alia, by applying a stacking pressure to the cell pack prior to insertion into the cell container (and prior to addition of electrolyte). It has been found that a stacking pressure of at least 100 p.s.i., and more preferably in the range of 250 to 1,000 p.s.i. or more is greatly beneficial in retarding dendritic growths therethrough, particularly zinc dendritic growths.

Additionally, the bibulous layer adjacent the negative electrode should be homogeneously wetted along its surface with electrolyte, be uniformly microporous and have a high absorbency to alkaline electrolyte (35 weight percent KOH) preferably in the range from about 0.55 to about 0.95, and more preferably from about 0.7 to about 0.9 grams of electrolyte per cubic centimeter of separator.

Examples of particularly preferred materials meeting the above criteria for the bibulous layer include cellulosic materials, particularly cotton based cellulosic materials and most preferably fine grade filter papers, i.e., microporous filter papers which resist attack from alkaline electrolyte and are resistant to oxidation. These preferred cotton based cellulosic materials have a degree of polymerization preferably of at least about 3500 and more preferably of at least 7500, where the degree of polymerization is defined as the number of anhydroglucose units per molecule. A variety of non-cellulosic materials are also suitable and include such materials as microporous rubbers, or plastics, e.g., microporous neoprene, microporous polyvinylchloride and microporous polyethelene.

Referring to FIG. 3 of the drawings, the space 22 between the cell pack and the cell wall 12 contains a relatively non-absorbent material 32. By relatively non-absorbent is meant that the material 32 is porous and preferably has an absorbency to electrolyte of less than about 25%, and more preferably less than about 5% of its pore volume. Most preferably, the relatively non-absorbent material 32 carries electrolyte in the form of a thin film 34 along its outer surface or on the surface of its fiber components. The configuration of the non-absorbent material may be quite varied and may include a plurality of fibers, a mat, felt, flock, etc. In any event, the thin film 34 of electrolyte should form a bridging electrolyte wicking path between the opposite polarity electrodes and contiguous bibulous separators around the extended triplex separator, yet should be sufficiently loosely packed and/or inherently porous to accommodate penetration of an oxidizing gas.

Various types of materials are useful for the non-absorbent material. Examples include polyamide fibers such as nylon, e.g., in the form of a porous mat sold under the trade name Pellon, and various other synthetic fibrous or porous polymers including polypropylene, polyethylene, polystyrene, vinyl polymers, and polytetrafluoroethylene which has been surface treated to allow electrolyte wetting. In addition to the previous properties mentioned, these materials should be substantially non-conductive of electrons.

A modification of the invention is shown in FIG. 4. In this instance, the electrode cell pack is in contact with a relatively non-absorbent layer 36 formed of a porous mat of fibers which carry a surface film of electrolyte on the fibers. The absorbency of this material 36 to electrolyte is the same as previously defined for the fibrous material 32 shown in FIG. 3. The space between the relatively non-absorbent layer 36 and container 12 is at least partially filled with one or more layers of a relatively absorbent material 38 in the form of a felt, mat, gel, film, disk or other configuration. This absorbent layer 38 is preferably bibulous in nature, and may be similar in structure to the bibulous layers 28 and 28' employed in the separator, as hereinbefore defined. This bibulous material has a high affinity for electrolyte through adhesion, absorption, or by capillarity or other force. In essence, the bibulous layers 38 form an electrolyte well which is automatically "tapped" when one of the separator bibulous layers 28 or 28' becomes drier than the other bibulous layer on the adjacent side of the membrane 30. When either of the separator bibulous layers becomes dry, electrolyte from the well 38 wicks along the surface of the members composing the relatively non-absorbent layer 36 and then either is admitted directly into the dry separator bibulous layer or along the surface of the membrane 30 and then into the dry separator bibulous layer. When either of these separator bibulous layers is dry with respect to the other one, this dryness apparently creates the wicking or pulling force which allows the well to be tapped until the dry bibulous layer is wet enough to be in relative wetting equilibrium with the other bibulous layer across the membrane. Thus, adequate electrochemical reactions at the electrodes are again permitted.

It should be noted that the use of the relatively non-absorbent layer in both FIG. 3 and FIG. 4 permits the thin film of electrolyte formed on the fiber or flock particles to be highly exposed to the presence of an oxidizing agent, e.g. oxygen. For instance, as the cathode releases oxygen gas upon overcharge, some of the oxygen which has not yet recombined flows into the space between the cell pack and cell container and permeates the matrix formed by the relatively non-absorbent fibers or particles. This high oxygen access permits ready oxidation of any dendrites which may be in various stages of growth and extent. The resultant oxidation product is harmless in the cell environment.

The volume occupied by the space 22 containing the wicking material is preferably relatively small in comparison with the volume taken up by the cell pack. This space would normally be left open to prevent formation of a continuous wetting path for dendritic growth between opposite polarity electrodes. Thus, there is no diminution of cell capacity and the same available area of active material sites is present.

It should be understood that the invention is capable of a variety of modifications and variations which will be made apparent to those skilled in the art by a reading of the specification which are to be included within the sphere of the claims appended hereto.

What is claimed is:

1. In an electrochemical cell having a container enclosing a cell pack composed of opposite polarity electrodes sandwiching interposed electrolyte containing separator having extending edges, said separator comprising bibulous zones sandwiching an interposed semipermeable zone, said cell pack spaced away from at least a portion of the container, the improvement comprising:
a relatively non-absorbent surface wettable material interposed within at least a portion of the space formed between the container and cell pack, said surface wettable material intimately contacting at least a portion of the extending separator edges.

2. In the cell of claim 1 wherein said surface wettable material forms at least a portion of a wicking path for electrolyte between bibulous zones contiguous to opposite polarity electrodes.

3. In the cell of claim 1 wherein said semipermeable membranous zone extends beyond the edge of at least one of said adjacent bibulous zones.

4. In the cell of claim 1 wherein the cell is rechargeable and contains an electrochemically active zinc material as the basis of the negative polarity electrode.

5. In the cell of claim 4 wherein the positive polarity electrode contains an electrochemically active nickel-containing compound.

6. In the cell of claim 1 wherein the relatively non-absorbent material carries a thin film of electrolyte on its surface.

7. In the cell of claim 1 wherein said relatively non-absorbent surface wettable material is located solely within at least a portion of the space formed between the container and cell pack exclusive of the area transversely between the opposite polarity electrodes.

8. A rechargeable nickel-zinc alkaline electrochemical cell comprising a container, at least one nickel positive electrode, at least one zinc negative electrode, multilayer separator material interposed between adjacent electrodes, the outer separator layers composed of bibulous material highly retentive of alkaline electrolyte and sandwiching at least one semi-permeable membranous material which extends beyond the edges of at least one of said outer bibulous layers, the extending edges of said semi-permeable membranous material being spaced away from said container, and a relatively non-electrolyte-absorbent yet surface wettable material interposed within at least a portion of the space formed between the container and extending edges of said semi-permeable membranous material and in intimate contact with at least one of the separator layers.

9. The electrochemical cell of claim 8 wherein said surface wettable material forms at least a portion of a wicking path for electrolyte between bibulous layers contiguous to opposite polarity electrodes.

10. The electrochemical cell of claim 8 wherein said surface wettable material is composed of a porous material capable of retaining electrolyte in an amount less than about 25 percent of its pore volume.

11. The electrochemical cell of claim 8 wherein said surface wettable material is composed of a fibrous porous material capable of retaining electrolyte in an amount less than about 5 percent of its pore volume.

12. The electrochemical cell of claim 8 wherein a relatively electrolyte-absorbent material is interposed between and intimately contacts said container and said surface wettable material and is isolated from direct contact with the separator layers.

13. The electrochemical cell of claim 8 wherein the cell is in a normally sealed condition.

14. The electrochemical cell of claim 8 wherein the electrolyte is present in a relatively starved amount so that the bibulous separator layers are wetted for electrochemical reactions with the electrodes and yet there is substantially no free electrolyte present in the cell.

15. In an electrochemical cell having a container enclosing a cell pack composed of opposite polarity electrodes sandwiching interposed electrolyte containing separator having extending edges, said cell pack spaced away from at least a portion of the container, the improvement comprising:
a relatively non-absorbent surface wettable material interposed within at least a portion of the space formed between the container and cell pack, said surface wettable material intimately contacting at least a portion of the extending separator edges, and wherein said surface wettable material is composed of a porous material which retains electrolyte in an amount less than about 25 percent of its pore volume.

16. In the cell of claim 15 wherein said surface wettable material is composed of a porous material which retains electrolyte in an amount less than about 5 percent of its pore volume.

17. In an electrochemical cell having a container enclosing a cell pack composed of opposite polarity electrodes sandwiching interposed electrolyte containing separator having extending edges, said cell pack spaced away from at least a portion of the container, the improvement comprising:
a relatively non-absorbent surface wettable material interposed within at least a portion of the space formed between the container and cell pack, said surface wettable material intimately contacting at least a portion of the extending separator edges; and
a relatively electrolyte-absorbent material interposed between and intimately contacting said container and said surface wettable material and in which said relatively electrolyte-absorbent material is isolated from direct contact with the separator.

References Cited

UNITED STATES PATENTS

| | | | |
|---|---|---|---|
| 3,553,020 | 1/1971 | Corbin et al. | 136—6 B |
| 3,333,986 | 8/1967 | Chreitzberg et al. | 136—30 |
| 3,350,225 | 10/1967 | Seiger | 136—6 GC |
| 3,481,737 | 12/1969 | Siebenberg et al. | 136—162 |

DONALD L. WALTON, Primary Examiner

U.S. Cl. X.R.

136—30, 145, 162